United States Patent [19]

Miwa

[11] Patent Number: 4,856,166
[45] Date of Patent: Aug. 15, 1989

[54] METHOD FOR MANUFACTURING A GEAR FIT ARTICLE AND GEAR FIT ARTICLE PRODUCED THEREBY

[75] Inventor: Yoshihisa Miwa, Hiroshima, Japan

[73] Assignee: Mazda Motor Corporation, Hiroshima, Japan

[21] Appl. No.: 107,415

[22] Filed: Oct. 13, 1987

[30] Foreign Application Priority Data

Oct. 24, 1986 [JP] Japan .................. 61-253292

[51] Int. Cl.⁴ .................. B21D 53/28; F16H 55/00
[52] U.S. Cl. .................. 29/159.2; 29/525; 29/458; 29/424; 74/431
[58] Field of Search .............. 29/156.4 R, 159.2, 525, 29/458, 424; 74/431, 446, 447, 451

[56] References Cited

U.S. PATENT DOCUMENTS 4,141,126  2/1979  Okada .................. 29/156.4
4,761,867  9/1988  Vollmer et al. .................. 29/159.2

FOREIGN PATENT DOCUMENTS 52-128847  10/1977  Japan .

Primary Examiner—Bruce Y. Arnold
Assistant Examiner—J. P. Ryan
Attorney, Agent, or Firm—Fleit, Jacobson, Cohn, Price, Holman & Stern

[57] ABSTRACT

A method for manufacturing a novel gear fit article that includes metal plating the surface of an annular steel work is disclosed. The plating is made of copper to prevent nitriding of the underlying steel. The plated steel work is gear cut to form internal teeth of exposed steel. The annular gear is nitrided to harden the teeth and, in the process, softens the metal plating. Thereafter, the annular gear is shrinkage fitted into a rotor body to form the novel gear fit article.

13 Claims, 5 Drawing Sheets

HARDNESS CHANGE OF THE Cu PLATING LAYER
BY NITRIDING TREATMENT

METHOD FOR MANUFACTURING A GEAR FIT ARTICLE AND GEAR FIT ARTICLE PRODUCED THEREBY

BACKGROUND OF THE INVENTION

1. Field of the Invention

This invention relates to a method for manufacturing a gear fit article by fitting a gear part into a support member and to the article produced thereby.

2. Description of the Prior Art

Generally, a gear fit article, such as, for example, a rotor of a rotary piston engine, consists of a rotor body and an internal force fitted gear. The structure of such a gear fit article is shown, for example, in U.S. Pat. No. 3,762,377.

The manufacturing process of a rotor for use in a rotary engine typically comprises forming a steel work in the form of the internal gear by hot forging, heat treating to increase the surface hardness of the steel work, using, for example, quenching and tempering techniques, machining and gear cutting the steel work to form the desired internal gear. Thereafter, the rotor body and the internal gear are drilled together to form the necessary holes for pins to hold the rotor body and internal gear in a coupled state. Next, the internal gear is force fitted into the rotor body, and the pins are inserted into the commonly drilled, registering holes of the internal gear and the rotor body to fasten them together.

However, the gear fit article produced according to this known manufacturing process lacks fatigue strength due to the gear surface of the internal gear not having sufficient hardness.

Although nitriding treatments are known as a hard facing method for increasing fatigue strength of steel, steel treated by nitriding cannot be machined by gear cutting and drilling because the treated nitrided steel surface is very hard. Also, drilling a hole in a nitrided steel surface can be accomplished only with decreased accuracy because the steel surface is deformed by the heating utilized during the nitriding treatment.

Japanese Unexamined patent publication No. 52-128847 (1977) discloses treating a formed article to be nitrided with a metal plating to cover areas not to be nitrided to prevent the hard facing, and then nitriding the remainder of the article. This method is difficult to apply to a gear because of the requirement to plate all of the gear except the gear teeth which need the nitriding. This difficulty results in a serious impact on productivity.

While a rotary piston engine is operated, the fasteners which fix the internal gear to the rotor body receive stress due to the turning effort. Spring pins are normally used as the fasteners for absorbing this stress. However, these spring pins usually do not have sufficient strength to withstand large shearing forces.

The internal gear is typically force fit to the rotor body. However, the machined surfaces of the internal gear and the rotor body which engage due to the force fit do not have sufficient surface smoothness to create a high sticking force between the internal gear and the rotor body. Consequently, the shearing force imposed on the spring pins remains high and cannot be appropriately decreased by the sticking force between the internal gear and the rotor body.

SUMMARY OF THE INVENTION

In view of the foregoing situations, a primary object of the present invention is to provide a novel method of manufacturing a gear fit article having improved fatigue strength of the gear parts.

Another object of the present invention is to provide a method of manufacturing a gear fit article in which only the teeth surface portion of the gear parts can be easily hard faced.

Another object of the present invention is to provide a method of manufacturing a gear fit article in which only the teeth surface portions of the gear parts can be easily nitrided.

Another object of the present invention is to provide a method of manufacturing a gear fit article in which the gear parts, except for the gear teeth surfaces, can be easily machined after nitriding treatment of the gear parts, withstand any deformation usually encountered due to the nitriding treatment, such that high dimensional accuracy is obtained.

Another object of the present invention is to provide a method of manufacturing a gear fit article and an article so manufactured in which the shearing forces imposed on the fasteners are materially reduced on account of the substantially increased sticking force created between the fit portions, the interfitting surfaces of the internal gear, and the rotor body. This substantially increased sticking force of fit portions bears the predominant turning effort.

A further object of the present invention is to provide a method of manufacturing a gear fit article which can efficiently produce the gear fit article having only the gear teeth surfaces nitrided.

According to the present invention, the above and other objects are accomplished by the novel method for manufacturing a gear fit article according to the teachings and principles of the present invention. The novel method is carried out by first forming a suitable plating layer of a material on the surfaces of a steel gear work. The material used must be able to prevent a subsequent hard facing treatment from affecting the plated surface. Next, the plated gear work is machined to form gear parts, namely, gear teeth. During machining, the plating is stripped off and the teeth surfaces become exposed steel. The gear work is subjected to a hard facing treatment, such as gas soft nitriding or cementation. During treatment, the gear work is elevated in temperature. Only the exposed teeth surfaces of the gear work are hardened by the treatment; the remaining plating layer is softened.

Thereafter, the gear work is interference fitted into a support such as a rotor body with plated portions of the gear work being engaged with complementary portions of the support. As noted, the type of hard facing treatment employed may be a conventional nitride treatment, such as gas soft nitriding or a cementation treatment. If a nitriding treatment is used, generally the gear work is elevated to a temperature of from about 550° C. to about 580° C. for a time of from about 1 to about 6 hours with a ratio of atmosphere to gas flow quantity NH$_3$/endothermic gas for preventing de-carbonizing equal to from about 0.8 to about 1.2.

Steel, such as carbon steel or a steel alloy which contains an element suitable for nitriding, such as chromium, vanadium or aluminium, may constitute the material of the gear work. The metal plating material applied to the steel gear work may be copper or other material having the effect of nitriding prevention. The necessary or essential properties for the metal plating layer are that it will not melt during the nitriding treatment and will easily allow gear cutting.

On the other hand, the unstripped plating layer of the gear work is softened due to the elevated temperature of the nitriding treatment. As a result, when the gear work is force or interference fitted into the support, the softened plating metal fills the minute clearance between the rough surfaces of both parts, creating a very high sticking force between the gear work and the support, substantially increasing the cohesion therebetween. Hence, the shearing forces imposed on the fasteners are materially decreased. Further, the fit between the gear and the rotor must be such that a suitable transmissible torque from the support to the gear work is produced.

The thickness of the plating layer is preferably from about 5 μm to about 20 μm. When the thickness is less than about 5 μm, the nitriding treatment may penetrate. When the thickness of the metal plating is greater than about 20 μm, the transmissible torque from the support to the gear work becomes unacceptable due to the small strength of the metal plating.

The gear work produced according to the teachings of the present invention exhibits increased fatigue strength, and holes drilled in the gear work for fasteners have high accuracy for the reason that the holes are drilled after the nitriding treatment.

The above, and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
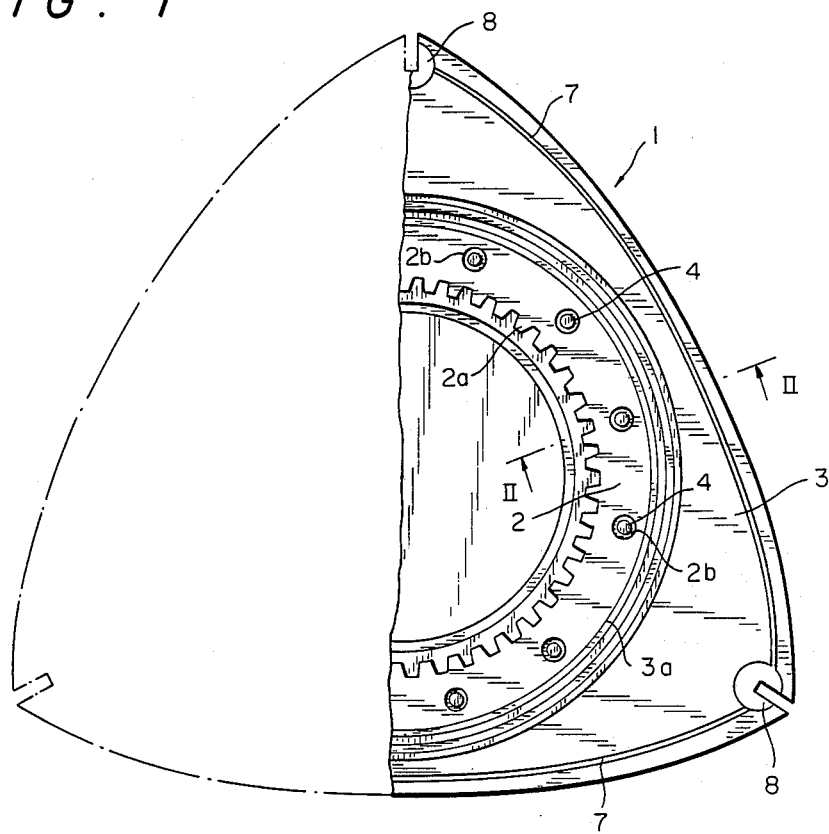
FIG. 1 is a front view of a rotor for a rotary internal combustion engine made as a novel gear fit article according to the principles of the present invention.

Now, the invention is described by way of the preferred embodiments as shown in the drawings.

Figure 2:
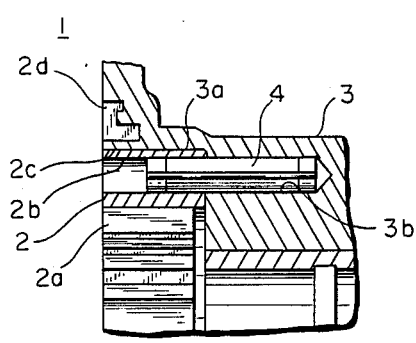
FIG. 2 is a fragmentary sectional view taken along the line II—II of FIG. 1.

Referring to FIG. 1 and FIG. 2, there is shown a rotor 1 for a rotary piston engine with the rotor 1 being made as a gear fit article. The rotor 1 consists of a rotor body 3 serving as a support member for an internal annular gear 2. The support member 3 is formed with a recess or hollow 3a. The outer peripheral surface portion 2c of the internal annular gear 2 fits into the recess or hollow 3a of the support member 3 with an interference fit. The gear 2 is formed with internal gear teeth 2a on its internal peripheral surface. Axially registering pin holes 2b, 3b which are formed in the gear 2 and rotor body 3, respectively, receive fitted spring pins 4 to hold these components together. Further, the rotor body 3 is provided with side seals 7 and corner seals 8. Element 2d represents an oil seal groove which is slidably fit on an oil seal ring as would be readily understood in the art.

Figure 4A:
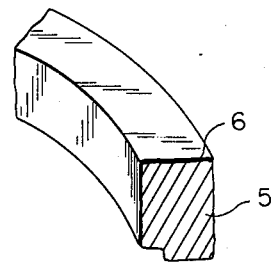
FIG. 4A is a fragmentary prespective view of a gear work prior to machining gear teeth.
Figure 4B:
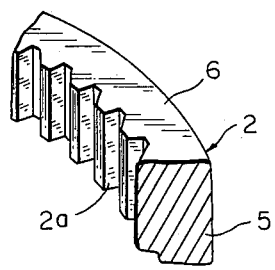
FIG. 4B is a fragmentary perspective view similar to FIG. 4A of a gear work after machining gear teeth.
Figure 3:
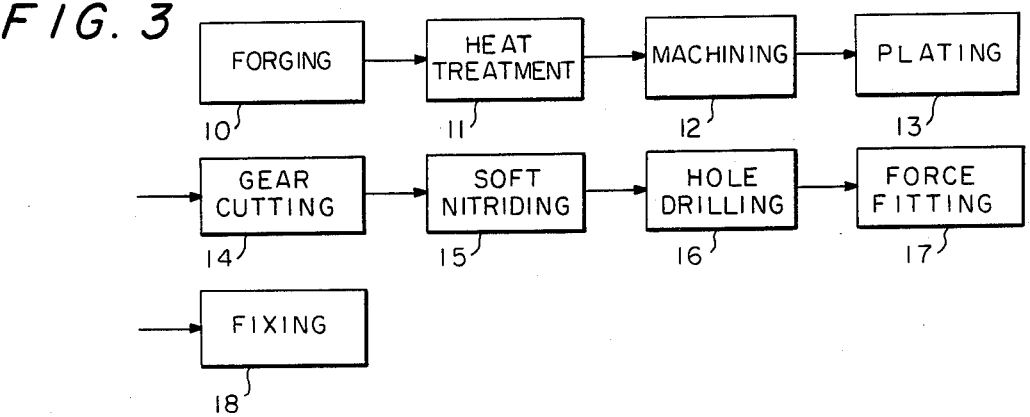
FIG. 3 is a flow chart showing the steps of the inventive method in accordance with one preferred embodiment.

FIG. 3 shows a flow chart of the steps for manufacturing rotor 1 in accordance with the principles of the present invention. First, a steel blank 5, as shown in FIG. 4A, is forged into a ring-like steel work for the internal gear 2 in block 10. The forging process typically consists of heating the blank to about 1100° to 1200° C., then forging the blank in a metal die and thereafter cooling the blank to approximately room temperature in air. After this forging, the ring-like steel work is subjected to a conventional heat treatment, for example, consisting of either quenching, annealing or normalizing in block 11.

If a quenching step is used, the typical process includes heating the work to about 850° to 900° C., holding at this temperature for approximately 30 minutes and thereafter quenching in oil to about room temperature. If a typical annealing process is utilized, the work is heated to about 550° to 650° C., is held at this temperature for approximately 1½ hours, and is cooled in air to about room temperature. If a typical normalizing step is utilized, the work is heated to about 850° to 900° C., is held at this temperature for approximately 30 minutes, and is cooled in air to about room temperature. The outer surface of the steel work is then finished by machining in block 12. Thereafter, the entire surface of the ring-like steel work 5 is plated with Cu to form a plating layer 6, see FIG. 4A, to a thickness of from about 5 μm to about 20 μm in block 13.

In the next step in the manufacturing method, gear teeth 2a are cut as represented in block 14 into the inner peripheral or circumferential surface of the ring-like plated steel work 5. During this gear cutting of teeth 2a, the plating 6 over the inner peripheral surface of gear 2 is stripped off or removed and the steel of the gear 2 which forms teeth 2a is exposed. Thereafter, the gear 2 is subjected to a soft nitriding treatment in block 15 at a temperature of from about 550° C. to about 580° C. for from about 1 hour to about 6 hours. During the nitriding treatment, the exposed steel surface portions of teeth 2a are nitrided and increase in hardness. Also, during this soft nitriding treatment, the plating layer 6 is heated and softened and the hardness of the plating layer 6 is decreased. At the same time, those steel areas of the gear 2 which are still covered or protected by the plating layer 6 will not be nitrided. Thereafter, in lapping condition, the gear 2 is positioned on the rotor body 3 and the axially registering pin holes 2b and 3b are drilled in block 16 at the same time. In the next step, represented by block 17, the gear 2 is interference force fitted into the recess or hollow 3a of the rotor body 3. During this step, the now soft plating metal 6 on the outer peripheral surface 2c fills the minute clearance between the outer peripheral surface 2c of gear 2 and the peripheral or circumferential surface of rotor body 3 defining recess or hollow 3a. Thus, the stick force or cohesion between the gear 2 and the rotor body 3 is materially increased. Finally, the gear 2 is fixed to the rotor body 3 by inserting, as represented in block 18, the spring pins 4 into the aligned pin holes 2b, 3b.

Test results of the gear fit article made in accordance with the foregoing description were as follows.

EXAMPLE I
Test piece 1 (Internal gear)

a. Material = S43C
   (carbon steel which meets the requirements of Japan Industrial Standard JIS G4051)
b. Process:
   hot forging → quenching and tempering (HV260)
   → machining → Cu Plating → gear cutting
   → soft nitriding → drilling together with a rotor
   → shrinkage fitting → fixing.
C. The conditions of the various treatments were as follows:
I. Copper plating
   plating bath: Copper Cyanide Bath
   CuCN 70 g/l
   NaCN 80 g/l
   KOH 15 g/l
   Treatment temperature: 60° C.
   Current density: 2A/dm$^2$
   Treatment time: 20 minutes
   Plating thickness: 10 μm
II. Soft nitriding
   Atmosphere: NH$_3$: Endothermic Gas
   (typically consisting of CO, H$_2$ and N$_2$ for preventing de-carbonizing) = 1:1
   Temperature: 570° C.
   Time: 3 Hours
d. Hardness of the plating layer
   Before soft nitriding: Hv90
   After soft nitriding: Hv84

EXAMPLE II
Test piece 2 (Internal gear)

a. Material: SCr430V
   vanadium added chromium alloy steel
   (SCr430 (chromium alloy steel which meets the requirements of Japan Industrial Standard JIS G4104) + 0.1 wt. % V)
b. Process
   hot forging → normalizing (HV240)
   machining → Cu plating →
   gear cutting → soft nitriding →
   drilling together with a rotor →
   shrinkage fitting → fixing
c. The conditions of the treatments were as follows:
   I. Copper plating
   (The same as Test piece 1)
   II. Soft nitriding
   (The same as Test piece 1)
d. Hardness of the plating layer
   (The same as Test piece 1)

Figure 5:
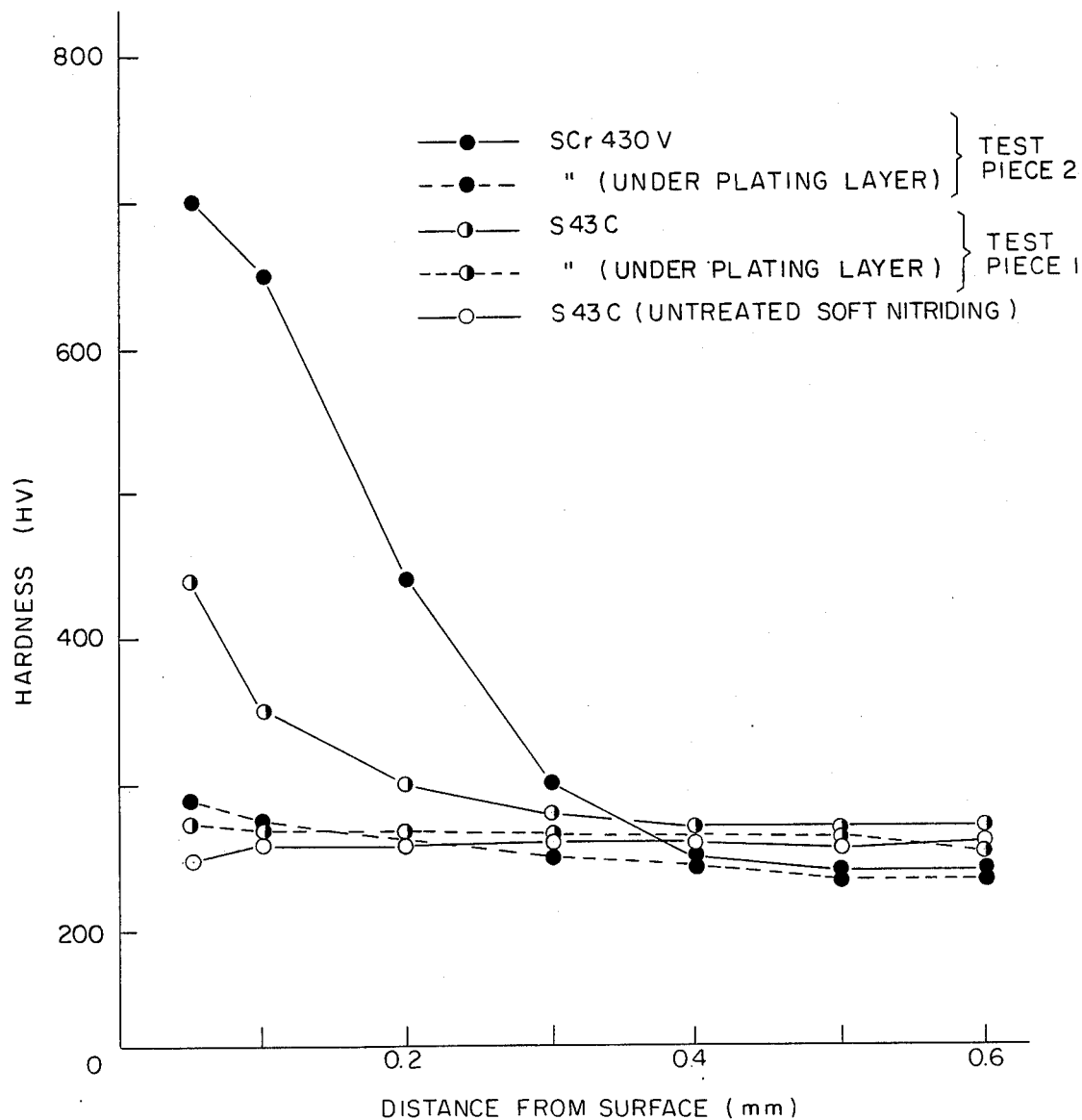
FIG. 5 is a graph showing the hardness of the gear teeth and the unstripped plated portions following the nitriding treatment.
Figure 6:
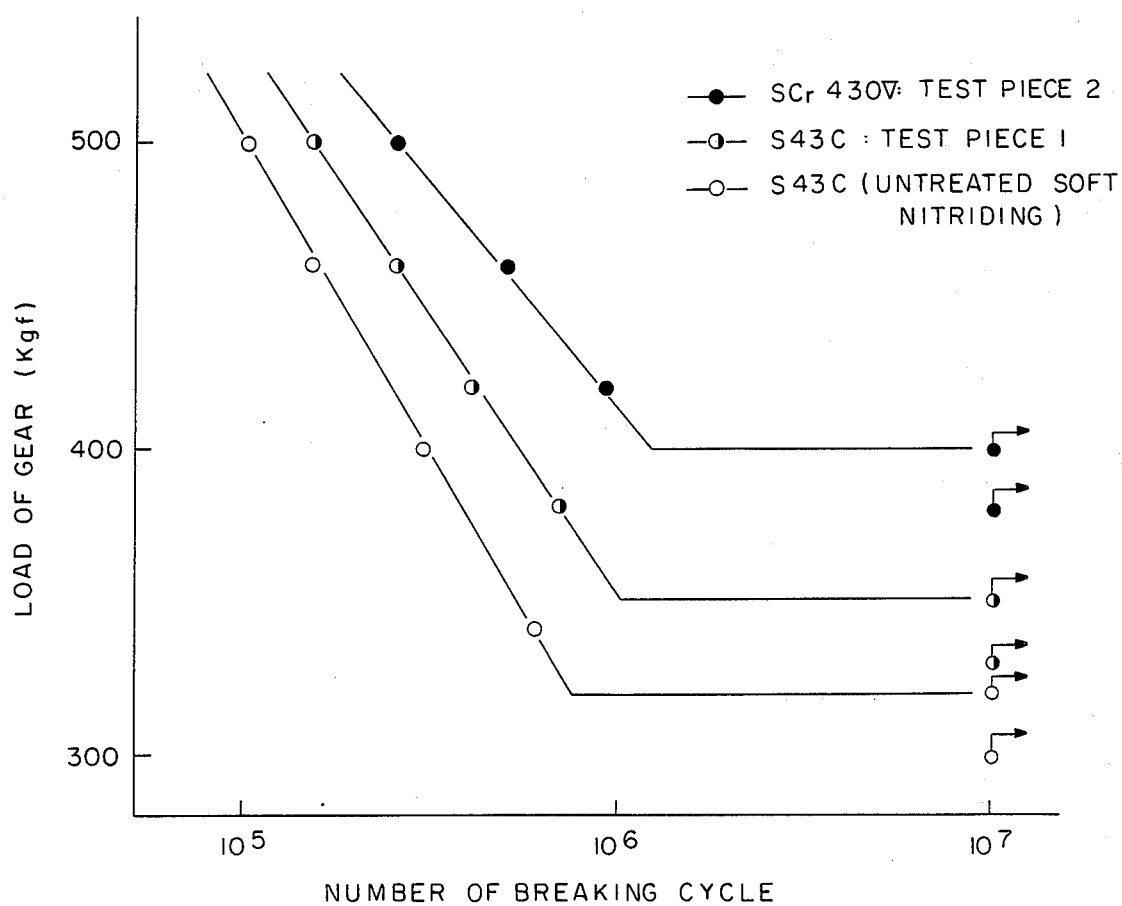
FIG. 6 is a graph showing the results of fatigue strength testing of the novel article.
Figure 7:
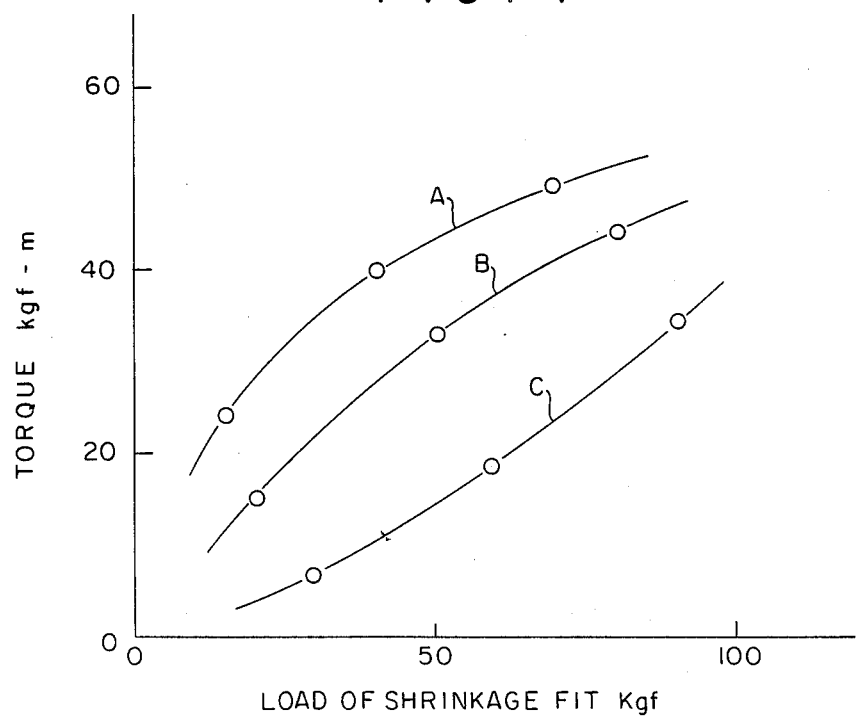
FIG. 7 is a graph showing the relationship between the load of shrinkage fit and the torque of the novel article.

The test results of Test piece 1 and Test piece 2 made according to the above conditions are shown in FIG. 5 to FIG. 7. FIG. 5 shows the relationship between hardness and its variations from the surface of the gear teeth surface into the gear 2, under the plating layer into the gear 2 and original untreated steel.

FIG. 6 shows the results of fatigue testing of the inventive test pieces and an untreated piece. As noted, both FIG. 5 and FIG. 6 show the hardness and the fatigue strength of S43C carbon steel which is not treated by nitriding, as a comparative example.

As can be appreciated from FIG. 5, the nitrided portions of the gear teeth 2a have materially higher hardness, with the SCr430V steel gear teeth 2a having substantially greater hardness. On the other hand, steel hardness under the plating layer 6 is changed very little. Hence, the plating layer 6 successfully prevented the nitriding treatment from adversely affecting the base steel in the protected areas.

As can be understood from FIG. 6, the increase of the hardness due to the nitriding brings about materially higher fatigue strength of the finished novel article.

FIG. 7 shows the results of testing the relationship between the fitting load on the gear 2 of Test piece 1 when force fitted into the rotor body 3 and the turning effort after the force fitting. Referring to FIG. 7, curve A shows the characteristics of the novel gear fit article which is made according to the present invention, subjected to a soft nitriding treatment and having a copper plating layer of 10 μm thick; curve B shows the characteristics of a gear fit article which is not made according to the present invention and is not subjected to a soft nitriding treatment but has a copper plating layer of 10 μm thick; and curve C shows the characteristics of a gear fit article which is also not made according to the present invention and does not have a plating layer but is subjected to a soft nitriding treatment.

Further, the fitting load changes in proportion with the difference in diameters of the recess 3a of the rotor 1 and the gear 2 respectively (i.e., the interference). In the preferred embodiment, the diameter of the gear 2 is greater than the diameter of the recess 3a by about 10 to about 30 microns.

A larger interference causes a larger fitting load. As can be appreciated from FIG. 7, curve A illustrates that gear fit articles made in accordance with the present invention are more stable and can obtain a larger turning effort by a smaller fitting load. This is achieved by the present invention because the copper plating layer 6 is softened by heating during the nitriding treatment, resulting in the sticking force or cohesion of the fitting portions being materially increased. The preferred range of the turning effort is from about 40 to about 50 kgf-m.

Figure 8:
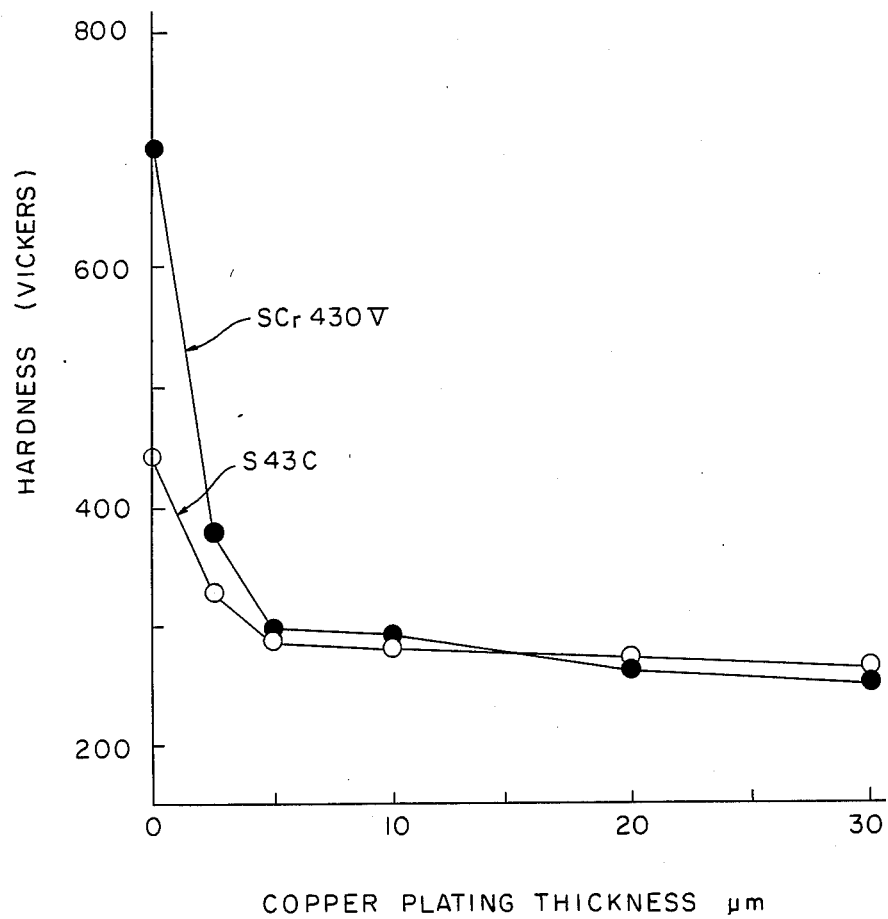
FIG. 8 is a graph showing the relationship between hardness and the copper plating thickness of the novel article.

FIG. 8 shows the results of a test comparing the relationship between the hardness of the surface portion of the soft nitriding treated gear parts and the thickness of copper plating layer.

In this test, the hardness of surface portion is measured at a depth of 50 μm from the surface of the steel gear parts, and the conditions of plating and soft nitriding are the same as performed for Test piece 1 and Test piece 2, except that the thickness of the copper plating layer is varied.

As can be appreciated from FIG. 8, when the copper plating thickness is smaller than about 5 μm, the steel hardness under the plating layer is increased, and thus shows that the plating layer is insufficient to prevent nitriding. On the other hand, when the copper plating thickness is larger than about 20 μm, the effect of the nitriding prevention is saturated.

Figure 9:
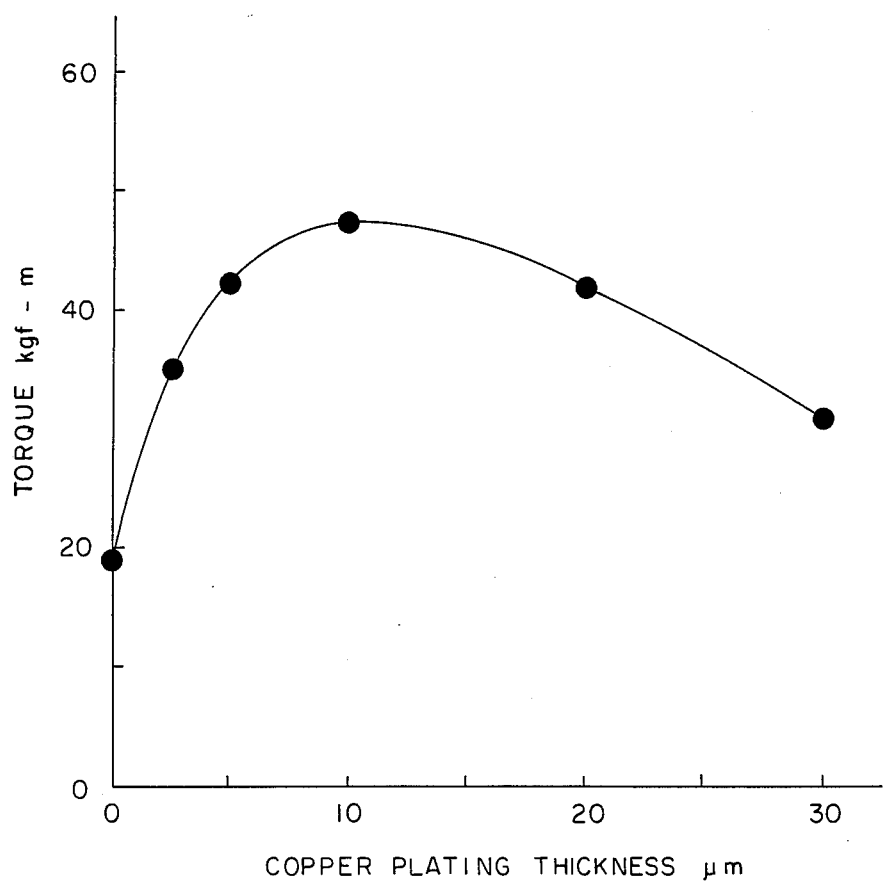
FIG. 9 is a graph showing the relationship between the copper plating thickness of the novel article and the torque of the novel article.

FIG. 9 shows the results of a test comparing the relationship between the transmissible torque from the supporting member to the fit gear parts with non-slip condition, to the thickness of the copper plating. In this test, the treatment conditions are the same as Test piece 2, except that the thickness of the copper plating layer is varied, and that a constant fitting load of 60 kgf is applied on the gear parts for force fitting to the supporting member.

As can be appreciated from FIG. 9, when the copper plating thickness is too small (i.e., less than about 5 μm), the torque is decreased because the sticking force of the fitting portion is decreased. On the other hand, when the copper plating thickness is too large (i.e., greater than about 20 μm), the torque is also decreased because the copper strength is small as compared with the ferrous material of the gear parts and the supporting member. To obtain the most preferable torque range of about 40 kgf-m to about 50 kgf-m, the plating thickness required is between about 5 μm to about 20 μm.

Figure 10:
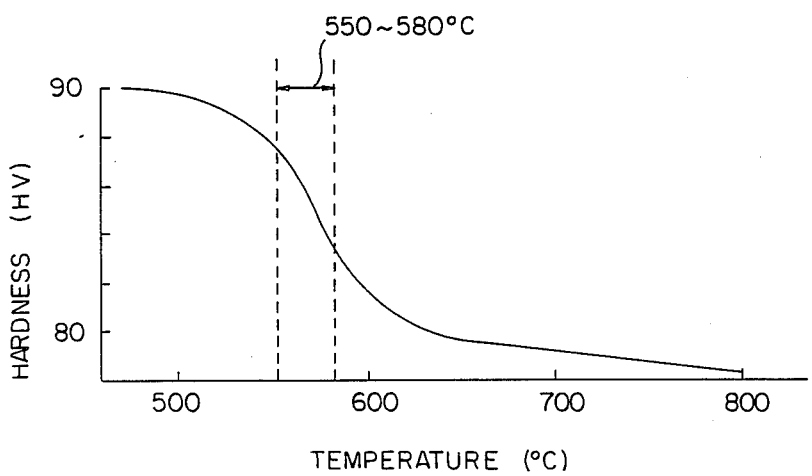
FIG. 10 is a graph showing the relationship between the nitriding temperature and the hardness of the novel article.

FIG. 10 shows the hardness change of the Cu plating layer by nitriding treatment. It is seen from FIG. 10 that the greatest change in hardness occurs in the temperature range between about 550° C. and about 580° C. Thus, this is the preferred temperature range for the nitriding treatment.

The invention has been shown and described with reference to specific embodiments. However, it should be noted that changes and modifications obvious to those skilled in the art may be made without departing from the scope of the appended claims.

What is claimed is:

1. A method for manufacturing a gear fit article comprising the steps of:
   forming a plating layer on a steel work to prevent hard facing treatment,
   gear cutting the plated steel work to form a gear having teeth of exposed steel,
   hard facing said gear so that the teeth of the gear are hardened and softening the plating layer during hard facing of said gear, and thereafter
   interference fitting the gear via plated portions thereof to a support member.

2. A method as claimed in claim 1, wherein said hard facing is nitriding treatment.

3. A method as claimed in claim 2, wherein the nitriding treatment is of the soft nitriding treatment type, the temperature range is from about 550° C. to about 580° C., and the treatment is for form about 1 hour to about 6 hours.

4. A method as claimed in claim 1, wherein the material of said plating layer is copper.

5. A method as claimed in claim 1, wherein the thickness of said plating layer is from about 5 micrometers to about 20 micrometers.

6. A method as claimed in claim 1, wherein the support member is a rotor body for a rotary piston engine, and the gear is an internal gear.

7. A method for manufacturing a gear fit article comprising the steps of:
   forming a plating layer on a steel work to prevent nitriding,
   gear cutting the plated steel work to form a gear having teeth of exposed steel,
   nitriding said gear at a temperature within a predetermined range to harden the teeth of the gear and to soften the plating layer,
   drilling overlying portions of the gear and the support member to form axially aligned holes for a fastener, and thereafter,
   interference fitting a fit portion of the gear having a plating layer thereon to fit a portion of a support member, and thereafter
   inserting a fastener into the aligned holes of the gear and supporting member.

8. A method as claimed in claim 7, wherein the nitriding treatment is of the soft nitriding treatment type, the temperature range is from about 550° C. to about 580° C., and the treatment is for from about 1 to about 6 hours.

9. A method as claimed in claim 7, wherein the material of said plating layer is copper.

10. A method as claimed in claim 9, wherein the thickness of said plating layer is from about 5 μm to about 20 μm.

11. A method as claimed in claim 7, wherein the thickness of said plating layer is from about 5 μm to about 20 μm.

12. A method as claimed in claim 7, wherein the support member is a rotor body for a rotary piston engine, and the gear is an internal gear.

13. A method as claimed in claim 12, wherein the material of said plating layer is copper and the thickness of said plating layer is from about 5 μm to about 20 μm.

* * * * *